United States Patent
Nanjundappa

(10) Patent No.: US 9,923,722 B2
(45) Date of Patent: Mar. 20, 2018

(54) MESSAGE AUTHENTICATION LIBRARY

(71) Applicant: GM Global Technology Operations LLC, Detroit, MI (US)

(72) Inventor: Manohar Reddy Nanjundappa, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/131,871

(22) Filed: Apr. 18, 2016

(65) Prior Publication Data

US 2017/0302452 A1 Oct. 19, 2017

(51) Int. Cl.
- *H04L 9/32* (2006.01)
- *B60R 16/023* (2006.01)
- *G07C 5/08* (2006.01)
- *H04L 29/06* (2006.01)
- *H04L 29/08* (2006.01)

(52) U.S. Cl.
CPC .......... *H04L 9/3242* (2013.01); *B60R 16/023* (2013.01); *G07C 5/0808* (2013.01); *H04L 63/0428* (2013.01); *H04L 63/08* (2013.01); *H04L 67/12* (2013.01)

(58) Field of Classification Search
CPC ... H04L 9/3242; H04L 63/0428; H04L 63/08; H04L 67/12; B60R 16/023; G07C 5/0808
USPC ........... 701/32; 455/411; 713/170, 150, 176; 726/4
See application file for complete search history.

(56) References Cited

U.S. PATENT DOCUMENTS

| 7,356,832 B1* | 4/2008 | Eibach | B60R 25/00 701/31.4 |
| 2012/0311340 A1* | 12/2012 | Naganuma | G06F 21/35 713/176 |
| 2015/0195297 A1* | 7/2015 | Ben Noon | B60R 16/023 726/22 |
| 2015/0351137 A1* | 12/2015 | Neff | G07C 5/0808 370/329 |
| 2017/0134382 A1* | 5/2017 | Darnell | H04L 63/10 |

* cited by examiner

*Primary Examiner* — Marthe Y Marc-Coleman
(74) *Attorney, Agent, or Firm* — David Willoughby; Reising Ethington P.C.

(57) ABSTRACT

A vehicle communication test system is described that includes a diagnostic computer having a computer program product stored thereon. The program product includes a non-transitory computer-readable medium for the diagnostic computer that includes an application software program stored on the computer-readable medium that includes instructions adapted to validate encrypted messages transmitted over a network connection in a vehicle. The instructions include: performing an initialization sequence that includes receiving initialization data at the diagnostic computer, wherein the initialization data is associated with a plurality of vehicle system modules (VSMs) which are coupled together via the vehicle network connection; receiving as a data input at the diagnostic computer an encrypted message transmitted over the network connection; and based on the initialization data, determining at the diagnostic computer whether the received encrypted message is valid.

20 Claims, 3 Drawing Sheets

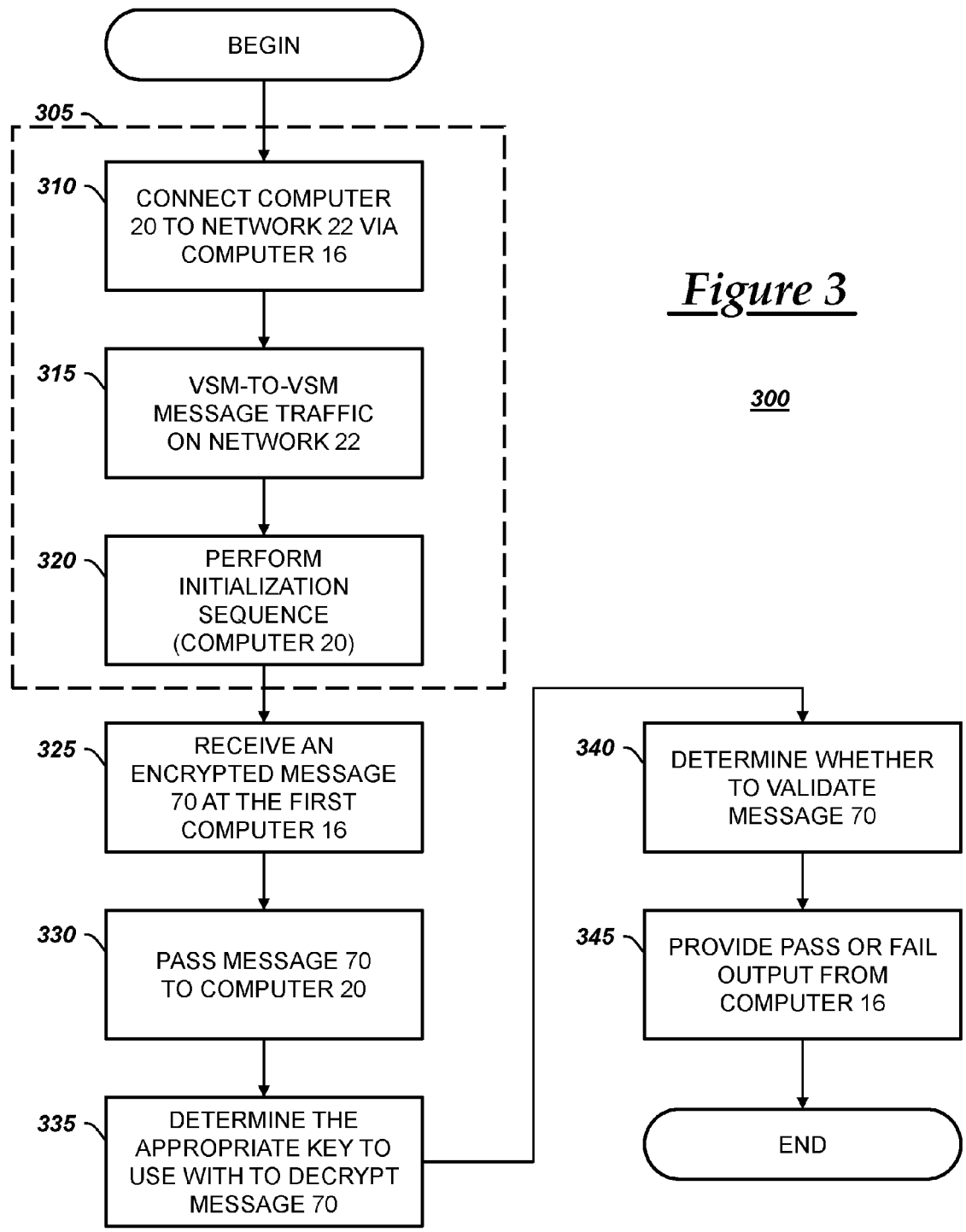

MESSAGE AUTHENTICATION LIBRARY

TECHNICAL FIELD

The present invention relates to application software for a diagnostic computer that includes a message authentication library for validating codes communicated over a vehicle bus.

BACKGROUND

Intra-vehicle message traffic may be encrypted. For example, a vehicle may have a number of electronic modules interconnected by a data bus, and the modules may communicate with one another over the bus to carry out vehicle functions. If a malicious attacker (e.g., a hacker) is able to gain access to the bus, the attacker may be able to manipulate or otherwise control some vehicle functions—e.g., to the detriment of an authorized user. Therefore, one conventional practice is to encrypt the message traffic sent over the bus (between the modules). Thus, if the attacker acquires unauthorized access, the attacker will only discover encrypted messages—making it less likely that the attacker can manipulate or control the vehicle.

During design and development, such vehicle data bus systems need to be tested to validate and verify that the system is operating properly—e.g., before the vehicle is sold to a customer (or authorized user). Vehicle manufacturers may out-source subsystem development to supplier(s). For example, the manufacturer may request a supplier to provide the bus and module interface (e.g., where the interfaces allow the modules to communicate with one another). During supplier development, the supplier often needs to test and validate the data bus system. However, the manufacturer may desire to not provide certain security data to the supplier—e.g., the manufacturer may desire to not provide the supplier with an encryption key to decrypt the internal message traffic. Thus, there is needed a mechanism or tool which can be provided to the supplier by which the supplier can validate the operation of the vehicle data bus system without providing the supplier the certain security data.

SUMMARY

According to an embodiment of the invention, there is provided a computer program product that includes a non-transitory computer-readable medium for a diagnostic computer that includes an application software program stored on the computer-readable medium that includes instructions adapted to validate encrypted messages transmitted over a vehicle network connection. The instructions may include: performing an initialization sequence that includes receiving initialization data at the diagnostic computer, wherein the initialization data is associated with a plurality of vehicle system modules (VSMs) which are coupled together via the vehicle network connection; receiving as a data input at the diagnostic computer an encrypted message transmitted over the network connection; and based on the initialization data, determining at the diagnostic computer whether the received encrypted message is valid.

According to another embodiment of the invention, there is provided a method of validating at a diagnostic computer an encrypted message transmitted over a vehicle network connection. The method includes: receiving initialization data at the diagnostic computer, wherein the initialization data is received from a plurality of vehicle system modules (VSMs) which are coupled together via the vehicle network connection; receiving an encrypted message at the diagnostic computer, wherein the encrypted message was transmitted by one of the plurality of VSMs over the network connection; based on the initialization data, determining at the diagnostic computer whether the received encrypted message is valid; and providing output data at the diagnostic computer indicating whether the received encrypted message was valid or invalid.

BRIEF DESCRIPTION OF THE DRAWINGS

One or more embodiments of the invention will hereinafter be described in conjunction with the appended drawings, wherein like designations denote like elements, and wherein:

FIG. 3 is a flow diagram illustrating a method of using the communication test system shown in FIGS. 1-2.

DETAILED DESCRIPTION OF THE ILLUSTRATED EMBODIMENT(S)

Figure 1:
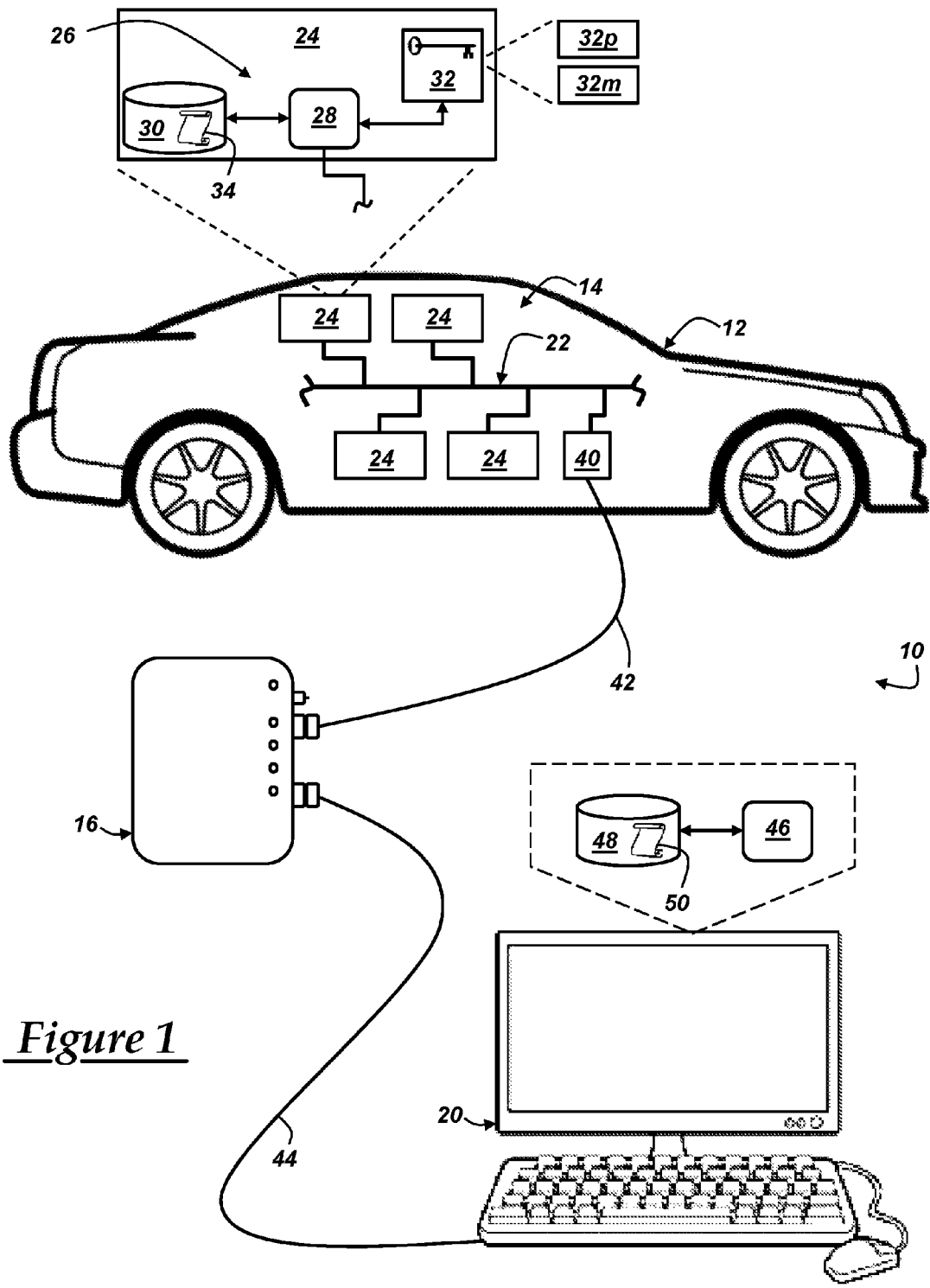
FIG. 1 is a block diagram depicting an embodiment of a vehicle communication test system that is capable of utilizing the method disclosed herein.

With reference to FIG. 1, there is shown an operating environment that comprises a vehicle communication test system 10 that can be used to implement the method disclosed herein. Test system 10 generally includes a vehicle 12 having a communication system 14 therein, a first diagnostic computer 16 for analyzing message traffic associated with the communication system 14, and a second diagnostic computer 20 for determining message traffic encryption. Together the first and second computers 16, 20 may be used by a vehicle subsystem supplier to validate the operation of the system 14; and more particularly, computer 20 may facilitate validating communication system security at the supplier without providing the supplier certain security data (e.g., encryption information such as one or more keys). It should be understood that the disclosed method can be used with any number of different systems and is not specifically limited to the operating environment shown here.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. The test system 10 described below may be performed when the vehicle 12 (or components thereof) are undergoing engineering/development, while located at a vehicle manufacturing facility (e.g. prior to sale), at an authorized vehicle service center (e.g., following the sale of the vehicle), or any other suitable location.

The communication system 14 in vehicle 12 includes a network connection 22 interconnecting multiple vehicle system modules (VSMs) 24. The network connection 22 is illustrated as a communication bus; however, this is merely an example. Non-limiting examples of suitable wired network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. It should be appreciated that other types of network connections 22 are contemplated, in addition to other wired and/or wireless networks. For example, in one embodiment, the VSMs 24 may be part of a wireless local (or vehicle) area network (e.g., a WLAN or WVAN)—e.g., operating according to any suitable short range wireless communication (SRWC) protocol. Non-limiting SRWC implementations include Wi-Fi, Wi-Fi Direct, any suitable Bluetooth protocol, just to name a few examples.

The VSMs 24 may be in the form of electronic hardware components that are located throughout the vehicle 12 and typically receive input from one or more sensors (not shown) and use the sensed input to perform diagnostic, monitoring, control, reporting and/or other functions. Each of the VSMs 24 is preferably inter-connected by a communications bus (e.g., connection 22). Non-limiting examples of VSMs 24 include a vehicle telematics unit, a GPS module, an engine control module (ECM), a powertrain control module (PCM), a body control module (BCM), and the like. For example, among other things, the telematics unit may enable communication with devices external to the vehicle—e.g., via cellular communication, as well as short range wireless communication (Wi-Fi, Bluetooth, etc.). A GPS module may receive GPS satellite data and be used to generate map data, as well as turn-by-turn navigation, just to name a few examples. An ECM may control various aspects of engine operation such as fuel ignition and ignition timing. And for example, a PCM may regulate operation of one or more components of the vehicle powertrain, while a BCM may govern various electrical components located throughout the vehicle 12, like the vehicle's power door locks and headlights. These of course are merely examples of VSMs 24; other implementations may be used instead of and/or in addition to those discussed above. While not intending to be limiting, vehicles such as vehicle 12 may have dozens of VSMs 24 (e.g., in one embodiment, 30-40 VSMs).

As shown in FIG. 1, each VSM 24 may include an electronic control unit (ECU) 26 that includes one or more processors 28 coupled to storage devices or memory 30 and a security peripheral or special cryptographic device 32. Processor 28 can be any type of device capable of processing electronic instructions including microprocessors, microcontrollers, host processors, controllers, vehicle communication processors, and application specific integrated circuits (ASICs). It can be a dedicated processor used only for the particular VSM 24 or can be shared with other vehicle systems. Processor 28 executes various types of digitally-stored instructions, such as software or firmware programs 34 stored in memory 30 (or on processor 28), which enable the VSM 24 to provide any suitable services. For instance, processor 28 can execute programs or process data to carry out at least a part of the method discussed herein, as discussed below.

Exemplary memory or computer usable storage devices 30 include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) such as processor circuits or devices (e.g., such as processor 28) which are capable of executing at least some predetermined instructions.

Security peripheral 32 may be any electronic device that receives message content data and either encrypts or decrypts that message content data, making it available to the instant VSM 24 or to another VSM 24 within the vehicle 12. For example, when the VSM 24 receives a message over the network connection 22, the security peripheral 32 may decrypt and validate the received message. When the message is determined to be not valid, the peripheral 32 may provide an indication of an error or potential security breach (e.g., to another VSM 24 or even to a remote server). And for example, before the VSM sends a message over the connection 22, the security peripheral 32 may encrypt the message.

In at least one embodiment, the security peripheral 32 is partitioned physically and logically from the remainder of the ECU 26 (and from other VSM components). For example, peripheral 32 may comprise separate hardware, separate software or firmware, or both. In one embodiment, the security peripheral 32 comprises a dedicated processor 32$p$, dedicated memory 32$m$, dedicated instructions, and the like; however, this is not required. Thus in one embodiment, only the peripherals 32 of each ECU 26 may have the capability to encrypt and decrypt message traffic sent over the network connection 22. Thus, it should be appreciated that any partitioning of the security peripheral 32 from the remainder of the ECU 26 and/or the network connection 22 may be adapted to prevent malicious attackers from acquiring and maliciously using the secret key information—e.g., to prevent unauthorized use of the vehicle 12 or vehicle system modules 24. For example, even if a malicious attacker breaches the connection 22 and/or one or more of the ECUs 26, the attacker would still need to breach the security peripheral(s) 32 in order to interpret a message or spoof a message. The physical and/or logical partitioning inhibits the attacker's likelihood of success.

Each security peripheral 32 in the vehicle 12 may store (e.g., in memory 32$m$) one or more keys or secrets in a look-up table. The keys may be any suitable type of encryption key or code; however, in at least one embodiment, the keys are symmetric or shared keys. Furthermore, in at least one embodiment, the keys are known only to the security peripherals 32. Table I, shown below, is a non-limiting example of a look-up table (the contents of which could be stored in memory 32$m$). Further, while ten different keys are illustrated (Key1-Key10), it should be appreciated that other embodiments may have more or fewer keys.

TABLE I

| Counter ID | Shared Key |
|---|---|
| 1 | Key1 |
| 2 | Key2 |
| 3 | Key3 |
| 4 | Key4 |
| 5 | Key5 |
| 6 | Key6 |
| 7 | Key7 |
| 8 | Key8 |
| 9 | Key9 |
| 10 | Key10 |
| 11 | Key1 |
| 12 | Key2 |
| 13 | Key3 |
| 14 | Key4 |
| 15 | Key5 |
| 16 | Key6 |
| 17 | Key7 |
| 18 | Key8 |
| 19 | Key9 |
| 20 | Key10 |
| 21 | Key1 |
| 22 | Key2 |
| 23 | Key3 |
| 24 | Key4 |
| 25 | Key5 |
| ... | ... |

In at least one embodiment, each security peripheral 32 comprises a counter to generate a counter identifier (ID) or counter ID value that is associated with the keys. The counter may be configured in software; however, hardware implementations are also possible. The counter may be incremented in any suitable manner; however, in at least one embodiment, the counter is incremented each time a message is sent which is encrypted by the particular security peripheral 32. And based on the generated counter ID value, the security peripheral 32 may determine which key to use to encrypt the message being sent. Non-limiting examples of counter ID values are shown in Table I as well; again, these are intended to merely illustrate the look-up table.

Table I illustrates that each key may be associated with one or more counter ID values. In this implementation, counter ID values 1, 11, 21, etc. (e.g., n+10) are associated with Key1. Similarly, counter ID values 2, 12, 22, etc. (e.g., again, n+10) are associated with Key2, etc. This is merely an example to illustrate that a single key may be associated with multiple counter ID values. Other implementations are also possible.

When transmitting a message from a sender-ECU 26 to a target-ECU 26, a corresponding sender security peripheral 32 may receive message content (e.g., from its corresponding VSM 24 and/or via ECU 26). In one embodiment, the sender peripheral 32 then may generate a message authentication code (MAC) by signing the message content with one of the keys in the look-up table (e.g., according to the peripheral's counter ID value). The use of a MAC is also exemplary; e.g., other forms of encryption may be used instead. Encryption signatures—including MACs—are generally known and will not be described further here. Thereafter, peripheral 32 may increment the counter (of course, in other embodiments, the counter may be incremented prior acquiring a key from the look-up table).

To transmit the message, the peripheral 32 may prepare a message body and header. In at least one embodiment, the body of the message includes unencrypted message content and the MAC (e.g., encrypted message content), and the header includes an unencrypted counter ID value associated with the key used to encrypt the message. In some implementations, the header and/or message body may include other data; e.g., such as an identifier of the ECU, a priority value, etc. Once the message is prepared by the peripheral 32, the sender-ECU 26 may receive it therefrom and transmit it over the network connection 22.

When the target-ECU 26 receives the message, the message may first be authenticated by its respective security peripheral 32 (e.g., a target security peripheral). Messages which cannot be authenticated may be ignored (e.g., and may result in error-reporting within the communication system 14 or to a remote server, vehicle backend system, or the like). Thus upon receipt, the target peripheral 32 may extract the counter ID value from the header. Using the extracted value, the peripheral 32 may determine using its own look-up table which key to use to decrypt the message. For example, the look-up table in the target peripheral 32 may be the same as the look-up table in the sender peripheral 32.

Using the appropriate key, the target peripheral 32 then may decrypt the MAC. The decrypted MAC may yield decrypted message content data. The target peripheral 32 then may compare this decrypted content data to the unencrypted content data received in the body of the message. If the decrypted message content is the same as the unencrypted message content, then the target security peripheral 32 authenticates or validates the message. However, if the decrypted message content is not identical to the unencrypted message content, the message is ignored and deemed invalid.

As shown in FIG. 1, in at least one embodiment, the network connection 22 includes a diagnostic port 40—e.g., for diagnostic and/or other access to communication system 14. The port 40 may connect directly to the network connection 22, or in some implementations, the port 40 may be located on a VSM 24 or ECU 26—e.g., being coupled indirectly to the connection 22. For example, in at least one embodiment, the diagnostic port 40 may be adapted to connect to a test VSM or diagnostic test tool, such as the first diagnostic computer 16. The implementation of diagnostic ports are generally known; skilled artisans will appreciate various aspects of their use.

Turning now to the first diagnostic computer 16, computer 16 may be any commercial data logging computer or any device enabling communication with connection 22. In one embodiment, the computer 16 is merely an interface between the communication network connection 22 and the second diagnostic computer 20. In another embodiment, computer 16 may be adapted monitor data bus traffic by receiving one or more serial inputs; and it may be adapted to test or simulate data bus traffic using one or more serial outputs—e.g., connecting to port 40 via a cable or harness 42. For example, using computer 16, message traffic on the connection 22 may be received, monitored, analyzed, simulated, calibrated, and the like. In addition, computer 16 may transmit test messages onto the connection 22 as well. In at least one implementation, the first diagnostic computer 16 is used by a vendor or supplier to a vehicle manufacturer, and the computer 16 is unable to decipher encrypted message traffic—e.g., because the message keys are known only to the security peripherals 32 of the respective ECUs 26 on the connection 22. Non-limiting commercial examples of first computer 16 include data loggers such as CANoe by Vector Informatik GmbH and Vehicle Spy by Intrepid Control Systems, Inc., just to name a couple.

First computer 16 is shown coupled to the second diagnostic computer 20 via another cable or harness 44. The second diagnostic computer 20 may be any suitable computing device having one or more processor(s) 46 and memory 48. The processor(s) 46 and memory 48 may have any suitable hardware characteristics or parameters—e.g., being similar to that described above (with respect to processor 28, memory 30), except that each component 46, 48 is part of computer 20 (e.g., rather than VSM 24). For example, computer 20 may be adapted to execute operating system instructions and any suitable software application 50 stored in memory 48. In at least one embodiment, second computer 20 is a laptop or desktop computing device used by authorized vehicle technicians and/or engineers in the development of vehicle communication system 14; however, this is merely a non-limiting example. Thus, in some implementations, computer 20 may be accessible via a private or public network such as the internet. In this manner, computer 20 may communicate test data or test results to a vehicle backend system or server which stores and analyzes vehicle data associated with multiple vehicles.

At least one software application 50 stored in memory 48 includes a message authentication library. The library may be a set of instructions adapted to receive encrypted messages as input (e.g., using the computer 20), decrypt the messages, and thereby attempt to validate that the messages sent over the connection 22 by the VSMs 24 are uncorrupted or otherwise valid. The software application 50 may be provided to vendors or suppliers to aid such suppliers in the development and testing of communication system 14. It should be appreciated that using the application 50, suppliers may determine whether a transmitted or received message on the connection 22 is VALID or INVALID (e.g., Pass or Fail). However, according to at least one embodiment, the application library 50 may not provide the supplier with access to the actual encryption keys used to determine the validity.

Figure 2:
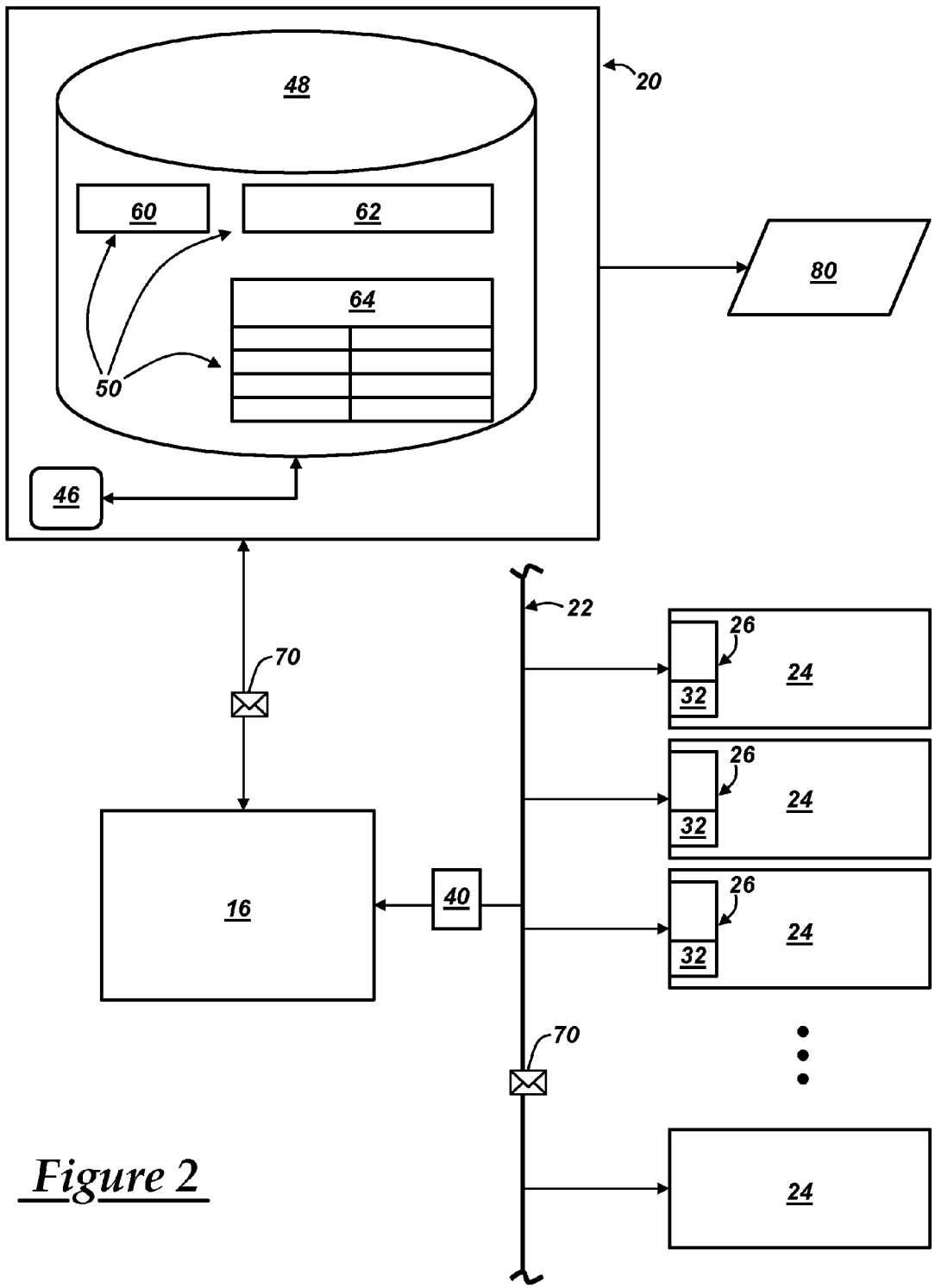
FIG. 2 is a schematic diagram of a portion of the system shown in FIG. 1.

Turning now to FIG. 2, the illustration includes a schematic representation of some of the components of the communication test system 10 (shown in FIG. 1). More particularly, the application library 50 schematically is illustrated having test instructions 60, one or more cryptographic algorithms 62, and a calibration table 64—each of which may be stored in a memory device 48 of computer 20. The instructions 60 may be adapted to operate similar to the instructions stored and executed in each of security peripherals 32 (e.g., in each ECU 26). As will be explained in greater detail below, a message sent over the network connection 22 may be decrypted at the target ECU 26, as well as at the second computer (using instructions 60). Similarly, using the instructions 60, the library 50 could transmit a message onto the connection 22 directed to one of the VSMs 24—e.g., encrypting the message before transmission; again, this will be explained in more detail below.

The cryptographic algorithms 62 may include any suitable number of algorithms known in the art or hereinafter contemplated. In this manner, the application library 50 may be used with communication systems 14 for different vehicles—e.g., where one vehicle uses one or more algorithms and where another vehicle uses at least one different algorithm. Thus, second computer 20 and library 50 can be operable across different vehicle platforms.

The calibration table 64 may include look-up table information from each of the security peripherals 32 in the vehicle 12. For example, table 64 may include the keys used by each of the peripherals 32 in the vehicle 12, as well as the current counter IDs of each of the peripherals 32. As will be explained more below, when the diagnostic computer 20 is connected to the connection 22 (e.g., via computer 16), an initialization or calibration sequence may occur wherein the application library 50 downloads or receives counter data from each security peripheral 32. The initialization sequence may include the library 50 receiving other data as well: e.g., an indication of the cryptographic algorithm(s) being used in the particular vehicle 12 and/or an indication of which keys are being used with respect to the counter IDs. These indications may be received by the library 50 using one or more identifiers or identifying codes. For example, a single code could be used to identify to the library 50 which algorithm(s) are being used in the vehicle 12 and which set of keys.

It should be appreciated that the library 50 could include calibration table data associated with a number of different platforms as well. For example, the library could comprise multiple sets of keys or the like. As will be described more below, using the test instructions 60, the cryptographic algorithms 62, and the calibration table 64, the application library 50 may attempt to validate encrypted messages transmitted over the connection 22 between VSMs 24 and report whether those encrypted messages were valid or invalid.

Thus, non-limiting examples of application library 50 include a software program(s) or computer program product comprised of program instructions in source code, object code, executable code or other formats; firmware program(s); hardware description language (HDL) files; or the like. Any of the above can be embodied on a computer usable or readable medium, which includes one or more storage devices or articles (e.g., such as memory 48). Further, in at least one embodiment, at least a portion of the application library 50 may be stored on dedicated hardware which may be installed into computer 20; e.g., partitioned from other processors and computing system hardware of the computer 20—e.g., for the same or similar reasons as those discussed above.

FIG. 2 also illustrates the first computer 16 passing message traffic 70 to the second computer 20. For example, computer 20—being coupled to the network connection 22 via port 40—may pass through encrypted messages to the second computer 20. One or more methods of using application library 50 will be described in greater detail below.

Method—

FIG. 3 illustrates a method 300 of determining whether a message transmitted within a vehicle communication system 14 is valid. Initial or preliminary step 305 includes steps 310, 315, and 320. In step 310, the first computer 16 may be connected to vehicle connection 22 via port 40, and second computer 20 may be connected to computer 16. For example, one end of harness 42 may be coupled to the port 40 and an opposing end of the harness 42 may be coupled to the first computer 16 (e.g., using connectors). Similarly, one end of harness 44 may be coupled to the first computer 16 and an opposing end of the harness 44 may be coupled to the second computer 20 (e.g., also using connectors). Ultimately, the application library 50 in computer 20 may be coupled to the network connection 22. This is merely one example; other wired or wireless implementations are contemplated also.

In step 315, VSM-to-VSM message traffic may ensue. This step may occur before, after, and/or during step 310. For example, messages 70 may be transmitted over the connection 22 from one VSM 24 to another. At least some of the message traffic may be encrypted using the security peripheral 32 of the respective sender VSM 24, as described above. In one embodiment, encrypted messages include a header carrying at least the counter ID value of the sender peripheral 32 and a payload carrying at least unencrypted message content and a MAC (that includes an encrypted version of the message content). It is contemplated that in at least one embodiment of step 315, method 300 occurs during engineering test and development. In some implementations, this may occur at a supplier which provides hardware associated with the communication system 14.

In step 320 which follows, the second computer 20 may perform an initialization or calibration sequence. The initialization sequence includes receiving counter ID values from each of the respective ECUs 26 (more specifically, from each of the respective security peripherals 32). For example, the security peripheral 32 may be configured to provide a counter ID status in response to a request from diagnostic computer 20. Thus, computer 20 may receive these counter ID values through the connections 42, 44. As discussed above, the counter ID of each peripheral 32 may differ depending upon its initial counter value, the quantity of messages transmitted onto the connection 22 by the particular ECU 26 (or VSM 24), how the particular counter is incremented (e.g., by ones or by some other quantity or algebraic expression), just to name a few examples. Counter ID values for each security peripheral 32 may be stored in memory 48 (at computer 20).

Step 320 may include receiving other data as well. For example (as discussed above), the computer 20 may receive and store data indicating which cryptographic algorithm(s)

are being used in vehicle 12, data indicating which keys (or set of keys) are being used at the ECU security peripherals 32, or both.

Following the initial step 305 (and step 320), an encrypted message 70 may be received by the first computer 16. Since the first computer 16 may not be configured to validate the authenticity of the message 70, it may be passed through to computer 20 as a data input (step 330). Thus, computer 16 may serve a filtering function in at least one embodiment—e.g., passing through encrypted message traffic to diagnostic computer 20. As discussed above, computer 16 may not carry or store any keys, cryptographic algorithms, test instructions, or the like; further, even if computer 16 did utilize some cryptographic techniques, it is contemplated that due to the architecture and design of the communication system 14, computer 16 could not decrypt message 70 since it would not be capable of identifying the appropriate key and/or algorithm to do so. For instance, the commercial examples (CANoe and Vehicle Spy) are not configured to decrypt the message 70. It should be appreciated that unencrypted messages sent over the network connection 22 however may be evaluated using first computer 16 (e.g., in at least one embodiment).

In step 335 which follows step 330, the second computer 20—or more specifically, processor 46—determines an appropriate key to use to decrypt the message 70. It should be appreciated that instructions 60 may imitate the security peripherals instructions—e.g., according to instructions 60, computer 20 extracts the counter ID value from the header of message 70 and looks up in memory 48 an associated decryption key. In at least one embodiment, this key may be a symmetric key (e.g., the same key used by the sender peripheral 32 to encrypt the message 70). The counter ID value may be used by processor 46 to identify the appropriate decryption key in a look-up table stored in second computer memory 48—e.g., selecting the key which matches the counter ID value. Step 335 further may include processor 46 extracting an ECU identifier from the message 70 (indicating which ECU 26 sent the message) and using this identifier to identify the appropriate key in the look-up table, to determine whether the message is valid, or both.

Thereafter in step 340, the processor 46 determines whether to validate message 70. For example, in accordance with the instructions 60, processor 46 extracts the MAC from the body of the message 70 and decrypts it using the key selected in step 335. If the MAC cannot be decrypted, the message is not validated. However, if the MAC is decrypted, the processor 46 compares the decrypted content to the unencrypted message content in the body of the message. If the decrypted content matches the unencrypted content, then processor 46 validates the message 70. Otherwise, the message 70 is not validated.

In step 345 which follows, the computer 20 provides output data 80 with respect to the message 70 (e.g., a PASS or FAIL output, as shown in FIG. 2). Non-limiting examples of the output include displaying the output on a computer monitor, exporting it in a report or log (e.g., with or without validation data of other message traffic), and the like. In this manner, a supplier may connect the second computer 20 to the vehicle 12 (e.g., via computer 16), may execute application software 50 using computer 20, and may receive validation data for each of the encrypted message traffic transmitted over the network connection 22. Further, all of these steps may occur without the supplier being granted access to confidential data within the security peripherals 32 of the vehicle 12, thereby improving overall vehicle security.

Other embodiments also exist. For example, the computer 20 (e.g., processor 46) may transmit a message having encrypted content onto the vehicle connection 22—e.g., intended for one or more VSMs 24. Using conventional methods, this would not be possible—e.g., first computer 16 is not equipped to perform such encryption. In some instances, this message transmitted from computer 20 may be an attempt to induce a response from one of the VSMs 24—e.g., to test functionality of a target VSM, wherein testing the functionality requires using encryption. Upon receipt by the target VSM 24, the security peripheral 32 therein may decrypt the message and, in certain circumstances, the VSM 24 may transmit an encrypted message in response—which may be received by diagnostic computer 20 in accordance with steps 325-345.

In another embodiment, VSMs 24 do not contain security peripherals 32. For example, this may occur in some legacy vehicles 12. In these embodiments, cryptographic data (e.g., one or more keys, algorithms, etc.) is stored in memory 30 and is executable using processor 28 (e.g., to perform any encryption/decryption). Thus, in at least one embodiment, application library 50 may identify such legacy vehicles using an identifier or other suitable means and determine the appropriate algorithm(s) and/or key(s) to use when decrypting message traffic therefrom.

In some embodiments, the manufacturer may provide the application library 50 to the supplier so that the supplier may install the library on diagnostic computer 20. For example, the manufacturer may provide the application software on a CD-ROM, flash-drive, or any other suitable media; or the manufacturer may make the software available for download via a computer server or the like. Of course, these are merely examples; others exist. For example, in another embodiment, the manufacturer may provide diagnostic computer 20 having the application library 50 installed thereon. In this embodiment, the manufacturer may partition the library in separate memory—e.g., executable by a dedicated processor or processing circuit.

In another embodiment, computers 16 and 20 may be configured into a single device or computer. In this instance, a single diagnostic device may be connected to the connection 22 in any suitable fashion—e.g., by wire or wirelessly. It should be appreciated that any of the embodiments disclosed herein can be used singly or in combination with other disclosed embodiments.

Thus, there has been described a vehicle test communication system that includes a diagnostic computer having a software application that includes a message authentication library. The diagnostic computer is configured to receive message traffic from the vehicle—in some instances, via another computer. Thereafter, using the library, the diagnostic computer is configured to determine whether encrypted message traffic sent over the vehicle network is valid or not and provide any suitable report. The library may be adapted to perform other functions as well; e.g., including sending encrypted test messages onto the network connection. Thus, the library enables the supplier to determine whether encrypted messages sent over the connection are valid without providing the supplier the cryptographic data or information needed to participate in any encryption or decryption processes. Thus, once the application software is installed on the diagnostic computer, the supplier may receive an indication whether encrypted messages sent over the vehicle connection are valid or not.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A computer program product, comprising: a non-transitory computer-readable medium for a diagnostic computer comprising an application software program stored on the computer-readable medium that includes instructions adapted to validate encrypted messages transmitted over a vehicle network connection, wherein the instructions include:
performing an initialization sequence that includes receiving initialization data at the diagnostic computer, wherein the initialization data is associated with a plurality of vehicle system modules (VSMs) which are coupled together via the vehicle network connection;
receiving as a data input at the diagnostic computer an encrypted message transmitted over the network connection, wherein the diagnostic computer comprises a second diagnostic computer that receives the encrypted message via a first diagnostic computer that is coupled to the vehicle network connection, wherein both diagnostic computers are non-vehicular devices, and wherein the second diagnostic computer is only coupled to the vehicle network connection via the first diagnostic computer;
based on the initialization data, decrypting the encrypted message to obtain a message; and
after decrypting the encrypted message, determining at the second diagnostic computer whether the message is valid.

2. The computer program product of claim 1, wherein the instructions further comprise providing output data at the second diagnostic computer that includes whether the received encrypted message was valid or invalid.

3. The computer program product of claim 2, wherein the output data is either Pass or Fail.

4. The computer program product of claim 1, wherein the vehicle network connection is a vehicle bus.

5. The computer program product of claim 1, wherein the instructions further comprise storing the initialization data in memory at the second diagnostic computer.

6. The computer program product of claim 1, wherein the initialization data comprises a counter identifier (ID) value associated with each of the plurality of VSMs, wherein each of the counter ID values are associated with a quantity of encrypted messages transmitted by each of the plurality of VSMs.

7. The computer program product of claim 1, wherein the initialization data comprises a plurality of counter identifier (ID) values, wherein each of the plurality of counter ID values are associated with a single cryptographic key, wherein the encrypted message comprises a counter ID value that matches one of the plurality of counter ID values.

8. The computer program product of claim 7, wherein the determining step in the instructions further comprises the second diagnostic computer identifying the single cryptographic key using the counter ID value received in the encrypted message and thereafter using the single cryptographic key to validate the encrypted message.

9. The computer program product of claim 1, wherein the encrypted message includes unencrypted content data and a message authentication code (MAC), wherein the MAC includes an encrypted version of the content data, wherein the decryption step includes decrypting the MAC, and wherein the determining step includes verifying the decrypted MAC.

10. A method of validating at a diagnostic computer an encrypted message transmitted over a vehicle network connection, comprising the steps:
receiving initialization data at the diagnostic computer, wherein the initialization data is received from a plurality of vehicle system modules (VSMs) which are coupled together via the vehicle network connection, and wherein the initialization data includes counter data that is used as part of a symmetric key encryption scheme;
receiving an encrypted message at the diagnostic computer, wherein the encrypted message was transmitted by one of the plurality of VSMs over the network connection, and wherein the encrypted message was encrypted according to the symmetric key encryption scheme;
based on the initialization data, decrypting the encrypted message according to the symmetric key encryption scheme using at least part of the counter data;
determining at the diagnostic computer whether the received encrypted message is valid; and
providing output data at the diagnostic computer indicating whether the received encrypted message was valid or invalid.

11. The method of claim 10, wherein the encrypted message was transmitted by one of the plurality of VSMs over the network connection to another one of the plurality of VSMs, wherein the diagnostic computer is coupled to the network connection such that the diagnostic computer receives the encrypted message.

12. The method of claim 10, wherein the diagnostic computer is coupled to the network connection via a data logger computer.

13. The method of claim 12, wherein the step of receiving the encrypted message includes the data logger computer passing through the encrypted message to the diagnostic computer, wherein the data logger computer is not adapted to decrypt the encrypted message.

14. The method of claim 10, wherein the initialization data comprises a counter identifier (ID) value associated with each of the plurality of VSMs, wherein each of the counter ID values are associated with a quantity of encrypted messages transmitted by each of the plurality of VSMs.

15. The method of claim 10, wherein the initialization data comprises a plurality of counter identifier (ID) values, wherein each of the plurality of counter ID values are associated with a single cryptographic key, wherein the encrypted message comprises a counter ID value that matches one of the plurality of counter ID values.

16. The method of claim 15, wherein the determining step further comprises the diagnostic computer identifying the single cryptographic key using the counter ID value received in the encrypted message and thereafter using the single cryptographic key to validate the encrypted message.

17. The method of claim 10, wherein the encrypted message includes a header that includes a counter identifier (ID) value and a payload that includes a message authentication code (MAC), wherein the counter ID value is associated with one of a plurality of counter ID values received in the initialization data, and further comprising the diagnostic computer determining whether the received encrypted message is valid based on identifying a cryptographic key stored at the diagnostic computer using the counter ID value received in the encrypted message.

18. A method of validating at a diagnostic computer an encrypted message transmitted over a vehicle network connection, comprising the steps:

receiving an at least partially encrypted message at the diagnostic computer from a vehicle system module via the vehicle network connection, wherein the at least partially encrypted message was transmitted by one of a plurality of VSMs over the network connection to another one of the plurality of VSMs, wherein the at least partially encrypted message includes an encrypted authentication code and unencrypted content data, and wherein the diagnostic computer is a non-vehicular device;

retrieving a secret key of a plurality of secret keys that corresponds to the vehicle system module through accessing a message authentication library that includes the plurality of secret keys that are used by the plurality of vehicle system modules (VSMs) connected to the vehicle network connection;

using the secret key to decrypt the encrypted authentication code to obtain a decrypted message content data; and comparing the decrypted message content data with the unencrypted content data to verify the at least partially encrypted message.

19. The method of claim 18, wherein the diagnostic computer is a second diagnostic computer and wherein the at least partially encrypted message is received at the second diagnostic computer via a first diagnostic computer, wherein the first diagnostic computer is a non-vehicular device that does not have access to the plurality of secret keys.

20. The method of claim 19, further comprising the step of receiving initialization data that includes one or more present counter identifiers (IDs) at the diagnostic computer, wherein the plurality of secret keys are associated with a plurality of counter IDs in the message authentication library, and wherein the secret key is selected based on at least one of the present counter IDs.

* * * * *